(12) United States Patent
Finkenberg

(10) Patent No.: US 12,013,882 B2
(45) Date of Patent: *Jun. 18, 2024

(54) SYSTEMS AND METHODS FOR GENERATING SEMANTIC NORMALIZED SEARCH RESULTS FOR LEGAL CONTENT

(71) Applicant: GoLaw LLC, Mamaroneck, NY (US)

(72) Inventor: Lincoln S. Finkenberg, Mamaroneck, NY (US)

(73) Assignee: GoLaw LLC, Mamaroneck, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/178,612

(22) Filed: Mar. 6, 2023

(65) Prior Publication Data

US 2023/0289373 A1    Sep. 14, 2023

Related U.S. Application Data

(63) Continuation of application No. 17/234,638, filed on Apr. 19, 2021, now Pat. No. 11,625,421.

(60) Provisional application No. 63/012,458, filed on Apr. 20, 2020.

(51) Int. Cl.

| | | |
|---|---|---|
| *G06F 17/00* | (2019.01) | |
| *G06F 16/332* | (2019.01) | |
| *G06F 16/338* | (2019.01) | |
| *G06F 40/109* | (2020.01) | |
| *G06F 40/169* | (2020.01) | |
| *G06F 40/30* | (2020.01) | |

(52) U.S. Cl.
CPC ........ *G06F 16/3323* (2019.01); *G06F 16/338* (2019.01); *G06F 40/109* (2020.01); *G06F 40/169* (2020.01); *G06F 40/30* (2020.01)

(58) Field of Classification Search
CPC .. G06F 16/3323; G06F 16/338; G06F 40/109; G06F 40/169; G06F 40/30; G06F 40/205
See application file for complete search history.

(56) References Cited

U.S. PATENT DOCUMENTS

| | | |
|---|---|---|
| 9,110,974 B2 | 8/2015 | Harada |
| 10,289,638 B2 | 5/2019 | Yuen et al. |
| 10,459,957 B2 | 10/2019 | Zomet et al. |
| 10,540,373 B1 * | 1/2020 | Lori ...................... G06F 16/285 |

(Continued)

FOREIGN PATENT DOCUMENTS

| | | | |
|---|---|---|---|
| WO | WO-2009091917 A9 * | 12/2009 | ............. G06F 15/16 |
| WO | WO-2019217999 A1 * | 11/2019 | |

*Primary Examiner* — Laurie A Ries
(74) *Attorney, Agent, or Firm* — Perkins Coie LLP; Alberto Araiza

(57) ABSTRACT

A method includes receiving a search query including clause text to be searched and executing the search query against the database. The method includes receiving a set of results, the set of results including documents that include a version of the clause text, and normalizing the set of search results. The method includes grouping the normalized set of search results into one or more groups of results, each group including documents containing a version of the clause text that is semantically equivalent to each other document in the group. The method includes receiving an indication of a selection of a particular group from among the one or more groups of results and causing display of at least a portion of the particular version of the clause text.

21 Claims, 12 Drawing Sheets

(56) References Cited

U.S. PATENT DOCUMENTS

| | | | |
|---|---|---|---|
| 10,902,197 B1* | 1/2021 | Lakshmanan | G06F 40/205 |
| 2006/0253449 A1* | 11/2006 | Williamson | G06F 40/166 |
| | | | 707/999.009 |
| 2007/0073745 A1 | 3/2007 | Scott et al. | |
| 2009/0182738 A1* | 7/2009 | Marchisio | G06F 16/3338 |
| | | | 707/999.005 |
| 2010/0063799 A1 | 3/2010 | Jamieson | |
| 2011/0055206 A1* | 3/2011 | Martin | G06F 40/289 |
| | | | 707/723 |
| 2011/0179032 A1* | 7/2011 | Ceusters | G06F 40/40 |
| | | | 707/E17.014 |
| 2011/0184729 A1 | 7/2011 | Nam | |
| 2012/0253793 A1 | 10/2012 | Ghannam et al. | |
| 2013/0046791 A1* | 2/2013 | Markman | G06F 16/367 |
| | | | 707/794 |
| 2014/0143680 A1 | 5/2014 | Angarita et al. | |
| 2014/0237359 A1 | 8/2014 | Privault et al. | |
| 2015/0161102 A1* | 6/2015 | Gidney | G06F 40/30 |
| | | | 704/9 |
| 2015/0199333 A1* | 7/2015 | Nekhay | G06F 40/268 |
| | | | 704/9 |
| 2017/0075877 A1* | 3/2017 | Lepeltier | G06F 40/117 |
| 2017/0249384 A1* | 8/2017 | Kandylas | G06F 16/358 |
| 2018/0096061 A1* | 4/2018 | Seuss | G06F 40/211 |
| 2018/0150459 A1* | 5/2018 | Farid | G06F 16/93 |
| 2018/0293235 A1 | 10/2018 | Ryger et al. | |
| 2019/0087455 A1* | 3/2019 | He | G06F 40/295 |
| 2019/0318223 A1* | 10/2019 | Xie | G06F 40/20 |
| 2021/0295037 A1 | 9/2021 | Walters et al. | |

* cited by examiner

Section 6.12. Waiver of Stay or Extension Laws. Neither the Company nor any Note Guarantor (to the extent it may lawfully do so) shall at any time insist upon, or plead, or in any manner whatsoever claim or take the benefit or advantage of, any stay or extension law wherever enacted, now or at any time hereafter in force, which may affect the covenants or the performance of this Indenture; and the Company and each Note Guarantor (to the extent that it may lawfully do so) hereby expressly waive all benefit or advantage of any such law, and shall not hinder, delay or impede the execution of any

95 power herein granted to the Trustee, but shall suffer and permit the execution of every such power as though no such law had been enacted.

ARTICLE VII

Trustee

Section 7.01. Duties of Trustee. (a) In case it is an Event of Default has occurred and is continuing, the Trustee shall exercise such of the rights and powers vested in it by this Indenture, and use the same degree of care and skill in their exercise as a prudent person would exercise or use under the circumstances in the conduct of such person's own affairs.

(b) Except during the continuance of an Event of Default:

(i) the Trustee the continuance of an Event of Default, the Trustee undertakes to perform such duties and no implied covenants or obligations shall be read into this Indenture against the Trustee the permissive rights of the Trustee shall not be construed as duties; and (ii) in the absence of bad faith on its part, the Trustee may conclusively rely, as to the truth of the statements and the correctness of the opinions expressed therein, upon certificates or opinions furnished to the Trustee and conforming to the requirements of this Indenture. The Trustee shall be under no duty to make any investigation as to any statement contained in any such instance, but may accept the same as conclusive evidence of the truth and accuracy of such statement or the correctness of such opinions. However, in the case of certificates or opinions required by any provision hereof to be provided to it, the Trustee shall examine the certificates and opinions to determine whether or not they conform to the requirements of this Indenture.

(c) The Indenture Trustee may not be relieved from liability for its own negligent action, its own negligent failure to act or its own willful misconduct, except that:

FIG. 9A

Section 6.12. Waiver of Stay or Extension Laws. Neither the Company nor any Note Guarantor (to the extent it may lawfully do so) shall at any time insist upon, or plead, or in any manner whatsoever claim or take the benefit or advantage of, any stay or extension law wherever enacted, now or at any time hereafter in force, which may affect the covenants or the performance of this Indenture; and the Company and each Note Guarantor (to the extent that it may lawfully do so) hereby expressly waive all benefit or advantage of any such law, and shall not hinder, delay or impede the execution of any

95 power herein granted to the Trustee, but shall suffer and permit the execution of every such power as though no such law had been enacted.

ARTICLE VII

Trustee

Section 7.01. Duties of Trustee. (a) If an Event of Default has occurred and is continuing, the Trustee shall exercise such of the rights and powers vested in it by this Indenture and use the same degree of care and skill in their exercise as a prudent person would exercise or use under the circumstances in the conduct of his or her such person's own affairs.

(b) Except during the continuance of an Event of Default:

(i) Except during the continuance of an Event of Default, the Trustee and undertakes to perform such duties and only such duties that as are specifically set forth in this Indenture and no others, and no implied covenants or obligations shall be read into this Indenture against the Trustee and in agreement that the permissive rights of the Trustee set forth herein to take the things covenanted in this Indenture shall not be construed as duties or duty; and (ii) in the absence of bad faith on its part, the Trustee may conclusively rely, as to the truth of the statements and the correctness of the opinions expressed therein, upon certificates or opinions furnished to the Trustee and conforming to the requirements of this Indenture. The Trustee shall be under no duty to make any investigation as to any statement contained in any such instance, but may accept the same as conclusive evidence of the truth and accuracy of such statement or the correctness of such opinions. However, in the case of certificates or opinions required by any provision hereof to be provided to it, the Trustee shall examine the certificates and opinions to determine whether or not they conform to the requirements of this Indenture.

(c) The Indenture Trustee may not be relieved from liability for its own negligent actions, its own negligent failure to act or

FIG. 9B

| Contract terms pasted all at once into the search | Results | |
|---|---|---|
| Section 7.01 Duties of Trustee. (a) If an Event of Default has occurred and is continuing, the Trustee shall exercise the rights and powers vested in it by this Indenture and use the same degree of care and skill in their exercise as a prudent person would exercise or use under the circumstances in the conduct of such person's own affairs. | Section 7.01. Duties of Trustee. (a) In case an Event of Default or default has existed, the Trustee shall exercise the powers vested in it by this Indenture and use the same degree of care and skill in their exercise as a prudent person would exercise or use under the circumstances in the conduct of such person's own affairs. | ✓ 73%<br>✗ |
| (2) Except during the continuance of an Event of Default. | (2) Except during the continuance of an Event of Default. | ✓ 53%<br>✗ |
| (i) the Trustee undertakes to perform such duties and only such duties as are specifically set forth in this Indenture and no implied covenants or obligations shall be read into this Indenture against the Trustee (it being agreed that the permissive rights of the Trustee to do things enumerated in this Indenture shall not be construed as a duty); and | (i) the Trustee undertakes to perform such duties and only such duties as are expressly set forth in this Indenture and no implied covenants or obligations shall be read into this Indenture against the Trustee (it being agreed that the permissive right of the Trustee to do things enumerated in this Indenture shall not be construed as a duty); and | |
| (ii) in the absence of bad faith on its part, the Trustee may conclusively rely, as to the truth of the statements and the correctness of the opinions expressed therein, upon certificates or opinions furnished to the Trustee and conforming to the requirements of this Indenture. The Trustee shall be under no duty to make any investigation as to any statement contained in any such instance, but may accept the same as conclusive evidence of the truth and accuracy of such statement or the correctness of such opinions. | (ii) in the absence of bad faith or negligence on its part, the Trustee may rely, as to the truth of the statements and the correctness of the opinions expressed therein, upon certificates or opinions furnished to the Trustee and conforming to the requirements of this Indenture. The Trustee shall be under no duty to make any investigation as to any statements contained in any such instance, but may accept the same as conclusive evidence of the truth and accuracy of such statement or the correctness of such opinions. | ✓ 33%<br>✗ |
| However, in the case of certificates or opinions required by any provision hereof to be provided to it, the Trustee shall examine the certificates and opinions to determine whether or not they conform to the requirements of this Indenture. | provided, however, in the case of certificates or opinions required by any provision hereof to be provided to it, the Trustee shall examine the certificates and opinions to determine whether or not they conform to the requirements of this Indenture. | ✓ 13%<br>✗ |
| (c) The Trustee may not be relieved from liability for its own negligent actions, its own negligent failure to act or its own willful misconduct, except that | (c) The Trustee may not be relieved from liability for its own grossly negligent actions, its own grossly negligent failure to act or its own willful misconduct, except that: | ✓ 9%<br>✗ |
| (i) this paragraph does not limit the effect of paragraph (b) of this Section; | (i) this paragraph does not limit the effect of paragraph (b) of this Section; | ✓ 3%<br>✗ |
| (ii) the Trustee shall not be liable for any error of judgment made in good faith by a Trust Officer unless it is proved that the Trustee was negligent in ascertaining the pertinent facts; | (ii) the Trustee shall not be liable for any error of judgment made in good faith by a Trust Officer unless it is proved that the Trustee was grossly negligent in ascertaining the pertinent facts; | ✓ 3%<br>✗ |

FIG. 10

SYSTEMS AND METHODS FOR GENERATING SEMANTIC NORMALIZED SEARCH RESULTS FOR LEGAL CONTENT

CROSS-REFERENCE TO RELATED APPLICATIONS

This application is a continuation of and claims priority to U.S. patent application Ser. No. 17/234,638, filed Apr. 19, 2021, which further claims the benefit of priority to U.S. Provisional Patent Application No. 63/012,458, filed Apr. 20, 2020. The entire contents of the above-noted applications are incorporated herein by reference throughout the disclosure of this document.

TECHNICAL FIELD

This application relates generally to computerized methods and apparatuses, including computer program products, for producing semantic normalized search results over legal content, markup display and automated contract review and commenting.

BACKGROUND

In the practice of law, legal provisions that purport to cover the same or similar subject matter can be drafted very differently. Therefore, isolating the substantive differences in how such legal provisions are drafted is important because these differences can result in a variance in legal benefits or detriments to the parties signing the contract. Isolating and utilizing substantive differences is important in nearly all legal practice areas, particularly in the areas of contract drafting and negotiation, review and research and litigation.

Present legal search systems and databases that provide for searching of contract databases for examples of legal clauses typically lack a way to normalize search results by content. Search results are almost entirely redundant lengthy lists and provide no benefit in gaining insights as to the substantive differences among results. The Securities and Exchange Commission's Electronic Data Gathering, Analysis, and Retrieval (commonly referred to as EDGAR) is a database that contains in excess of one million contracts and contract-related documents. The search results for examples of legal clauses from EDGAR-derived databases produce long lists of clauses. A super majority of results are redundant in content but displayed in search results. Typically, just a very small subset of the results have differences of legal substance and most have differences of no consequence. Results today are generally grouped using similarity or relevancy scores based on open source machine learning or indexing algorithms. These algorithms produce lists sorted in scored order but because a small variation in drafting causes a difference in scores, long lists of examples are produced wherein differences between the vast majority of results are inconsequential. The value of lengthy results is of little value because it is difficult, absent time consuming review, to quickly understand how these provisions are at all different from each other substantively. There's no quick way to gain insights as to substantive differences in drafting.

As an example of this problem, sixty results can be generated by a legal search system after preliminary normalization of 1,000 results of a user defined clause Prudent Person Standard of Care that was searched. In this example, the user pasted in a sample clause and 1,000 results were returned based on a maximum of 1,000 to display (the maximum number of results to be normalized can be set higher or lower) and after initial normalization and thereafter identical text results were grouped and thereby 60 results were returned representing the 1,000. It is very difficult and time-consuming to parse through the result set and determine the substantive differences between the respective provisions.

In addition, it is not possible to readily identify substantive differences that exist across the list of clause examples with the help of today's comparison tools. Market comparison tools such as the track change tool in Microsoft Word lack a way to distinguish between consequential and inconsequential changes. These comparison tools generally show all changes. When there are substantive differences between clauses, the number of inconsequential changes overshadow the substantive differences. In addition, non-consequential changes are not excluded from a redline or distinguished from those of consequence. This results in a markup with a lot of changes where it is difficult to quickly ascertain those changes that result in a difference in semantic substance. Further, today's redline tools' value are further diminished when content redundant results are not eliminated as an overwhelming number of clauses in the search results show no differences of consequence.

Today's extensive redundant content search results and inadequate comparison tools make it infeasible to understand the array of clause examples produced because it is not possible to see differences in substantive content which may have a legal bearing. In order to understand how sample clause results differ from a substantive basis it requires a time consuming manual review.

Some existing contract analyzer tools can assess differences among homogenous contracts. For example, a technology company will often use its form contract when entering into licensing agreements with companies who license their software. These are form agreements and are identical except to the extent they are negotiated. These contract analyzer tools can say which provisions are negotiated, the same as a redline tool does, but the tools are unable to do so for a pool of non-homogenous contracts. Contract analytics tools can isolate a negotiated term among a pool of form contracts, but are unable to analyze contracts terms when they are bespoke such as where the contract is not the company's form contract or a widely used industry form. For example, indentures are the governing contract of a company's debt issuance. Each issuer, underwriter, law firm and depending on the type of debt instrument result in highly varied and bespoke contracts, very few indentures are similar. Contract analytics tools are unable assess pools of non-homogenous contract terms to help the user understand if a term in their contract deserves close attention and whether it is drafted in a manner consistent with market practice. In addition, there aren't tools available to allow a lawyer to automate the negotiation of the contract's terms, whether bespoke or homogenous pools of contracts.

SUMMARY OF THE INVENTION

In view of the above limitations of existing legal search and contract analysis tools, the inventive computerized methods and systems described herein advantageously produce semantic normalized search results over legal content, markup display and automated contract review and commenting. The computerized methods and systems remove results that, although different, are redundant as to content by normalizing search text. The computerized methods and systems further deploy visual aids so a user can quickly ascertain substantive differences between legal clause search results. In addition, the computerized methods and systems automate the analysis and commenting of a contract's legal provisions across homogenous and non-homogenous contracts, which provides lawyers and other decision-makers with powerful tools in their analysis, review, drafting and negotiations.

It should be appreciated that the innovative techniques described herein solve the problem of highly redundant search results over databases of legal contracts. The overwhelming majority of contracts underlying legal clauses are widely used within its contract class or more widely. Changes are however made to them, but most often of no consequence. Changes can result due to transaction specific conventions with no legal or commercial bearing, differences in drafting style, naming convent and more. All of these differences have no legal bearing or substantive impact. But, they corrupt search results because they are all treated as distinct. A small subset, however, are negotiated with meaningful changes to the legal term. The inventive methods and systems described herein produce more focused search results by displaying just those provisions that are semantically different. As can be appreciated, understanding semantic differences among provisions by manual review requires analysis and is time consuming. Today's markup tools display all changes and don't distinguish changes of no semantic consequence, and this crowds out the ability to see important differences which frustrates and makes time consuming to analyze how the terms are meaningfully different. Today's comparison tools were built for showing changes between two documents under negotiation, not extensive lists or analysis of differences among a pool of a clause's semantic variations. The methods and systems described herein deploy display rotation, highlighting and markup algorithms of the results wherein substantive differences are clearly distinguished. In existing systems, the ability to analyze the legal terms of non-homogenous groups of contracts as to their normative use or legal bearing does not exist. In contrast, the innovative techniques described herein provide on an automated basis highlights and markup of semantic differences of bespoke contracts. In addition, existing contract analytics software does not provide for the automation of the making of legal comments to a contract. The inventive methods and systems described herein automates the making of comments of legal bearing to a contract.

Other aspects and advantages of the technology will become apparent from the following detailed description, taken in conjunction with the accompanying drawings, illustrating the principles of the technology by way of example only.

BRIEF DESCRIPTION OF THE DRAWINGS

The advantages of the technology described above, together with further advantages, may be better understood by referring to the following description taken in conjunction with the accompanying drawings. The drawings are not necessarily to scale, emphasis instead generally being placed upon illustrating the principles of the technology in various embodiments.

FIG. 2 is a diagram of an exemplary screenshot of a search user interface generated by the system.

FIG. 3 is a diagram of a user interface screenshot generated by the system showing the normalized text of the two groups of text that are different by selecting them.

FIGS. 9A and 9B are diagrams of user interface screenshots generated by the system that present an analyzed contract and a sample of a portion of the contract section with the normalization, comment to the contract and markup techniques applied.

FIG. 10 is a diagram of a user interface screenshot generated by the system that shows the side-by-side results in a tabular format.

DETAILED DESCRIPTION

Figure 1:
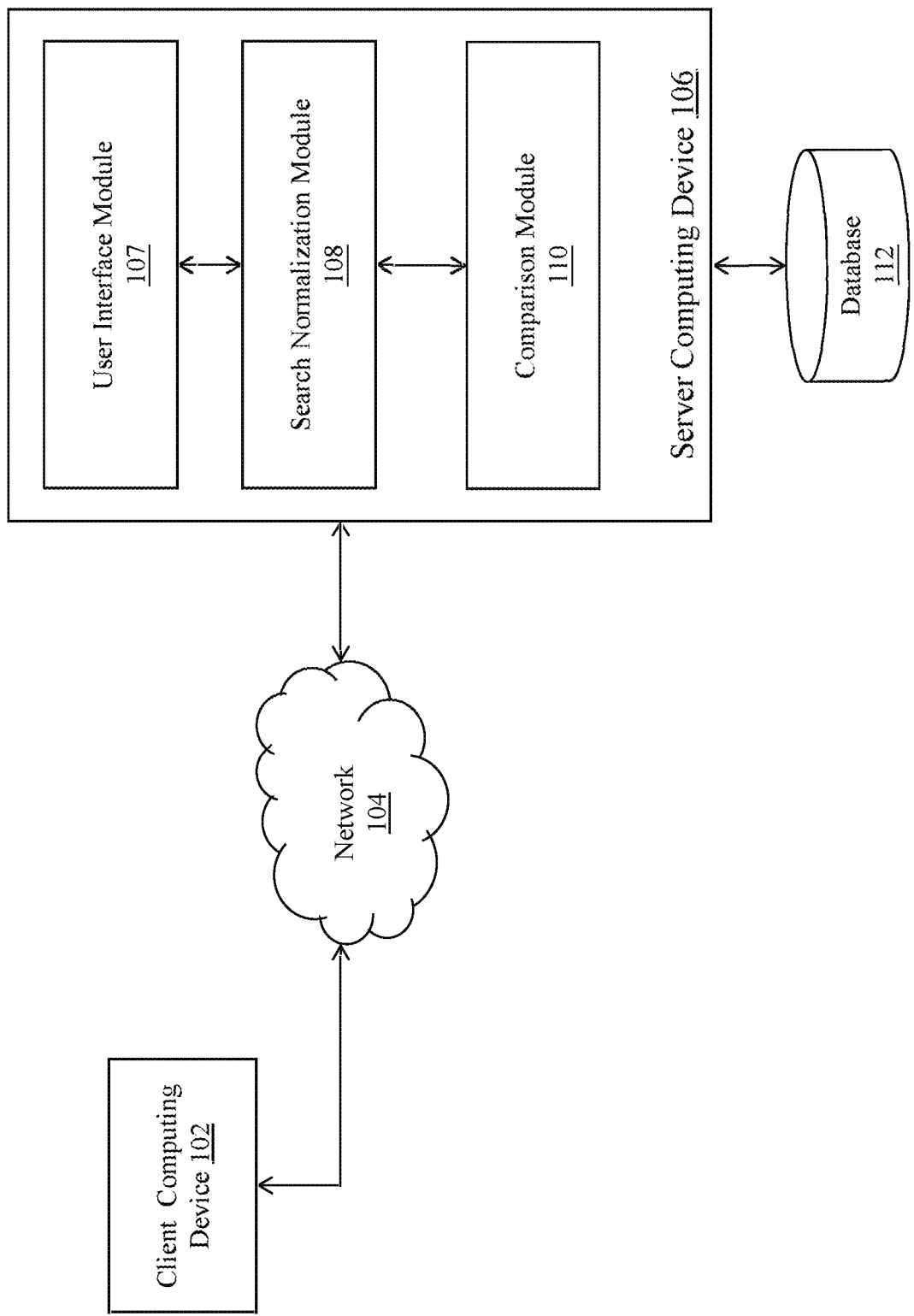
FIG. 1 is a block diagram of a system for producing semantic normalized search results over legal content, markup display and automated contract review and commenting.

FIG. 1 is a block diagram of a system 100 for producing semantic normalized search results over legal content, markup display and automated contract review and commenting. The system 100 includes a client computing device 102, a communications network 104, a server computing device 106 with a user interface module 107, a search normalization module 108 and a comparison module 110, and a database 112.

The client computing device 102 connects to the communications network 104 in order to communicate with the server computing device 106 for the purpose of performing functions associated with producing semantic normalized search results over legal content, markup display and automated contract review and commenting as described herein. For example, client computing device 102 can execute browser software (e.g., Chrome™ from Google, Inc., Microsoft® Edge available from Microsoft Corporation, and/or Mozilla® Firefox available from Mozilla Corporation) that connects to server computing device 106 to access one or more software applications made available by server computing device 106. It should be appreciated that the client device 102 can be operated to navigate to one or more web pages or network locations (e.g., such as URLs) that provide the above application(s). Exemplary client computing devices 102 include but are not limited to desktop computers, laptop computers, tablets, mobile devices, smartphones, and internet appliances. It should be appreciated that other types of client computing devices 102 that are capable of connecting to the components of the system 100 can be used without departing from the scope of invention. And, although FIG. 1 depicts a single client computing device 102, it should be appreciated that the system 100 can be configured to accommodate multiple client computing devices each connecting to server computing device 106 (e.g., in separate network sessions).

The communication network 104 enables the other components of the system 100 to communicate with each other for the purpose of performing functions associated with producing semantic normalized search results over legal content, markup display and automated contract review and commenting as described herein. The network 104 may be a local network, such as a LAN, a wide area network, such as the Internet and/or a cellular network, or a combination of each. In some embodiments, the network 104 is comprised of several discrete networks and/or sub-networks (e.g., cellular to Internet) that enable the components of the system 100 to communicate with each other. It should be appreciated that, in some embodiments, the client computing device 102 can be coupled directly to server computing device 106 (e.g., via a direct cable or wire) without requiring traversal of a communication network.

The server computing device 106 is a combination of hardware and software that includes specialized hardware and/or software modules that execute on a processor and interact with memory modules of the server computing device 106, to receive data from other components of the system 100, transmit data to other components of the system 100, and otherwise execute functionality associated with producing semantic normalized search results over legal content, markup display and automated contract review and commenting as described herein. The server computing device 106 includes a user interface module 107, a search normalization module 108, and a comparison module 110 that execute on a processor of the server computing device 106. In some embodiments, the user interface module 107, the search normalization module 108, and the comparison module 110 are specialized sets of computer software instructions programmed onto a dedicated processor in the server computing device 106 and can include specifically-designated memory locations and/or registers for executing the specialized computer software instructions. Further explanation of exemplary processing performed by the user interface module 107, the search normalization module 108, and the comparison module 110 is provided throughout the specification.

In some embodiments, the user interface (UI) module 107 can comprise a hardware and/or software module that interacts with client computing device 102 via a network communication session (such as using software to handle incoming web-based requests (e.g., HTTP) and to serve related content to the client computing device 102). For example, a user at the client computing device 102 can open a browser and type in a URL that points to a legal search and commenting application provided by the server computing device 106. The client device 102 establishes a connection with the server computing device 106 via communications network 104 (e.g., the internet) and the UI module 107 can provide content (e.g., graphical user interfaces, web pages, etc.) that relate to the legal search and commenting application. In some embodiments, the client computing device 102 comprises a front-end software application that stores certain data and executes certain functionality locally, and requests certain data and functionality from a back-end software component executing on the server computing device 106.

The search normalization module 108 can comprise a hardware and/or software module that interacts with client computing device 102 (either directly or indirectly, via the UI module 107) to execute search queries against database 112 for relevant legal provisions and other material as requested by client computing device 102. In some embodiments, the search normalization module 108 also comprises functionality to pre-process and analyze text of legal provisions provided by client computing device 102 to perform the above-referenced searches.

The comparison module 110 can comprise a hardware and/or software module that interacts with client computing device 102 (either directly or indirectly, via the UI module 107) to generate visual representations (e.g., markups, commenting) associated with the comparison of various legal provisions being requested by client computing device 102 for analysis.

The database 112 is a computing device (or in some embodiments, a set of computing devices) that is coupled to the server computing device 106 and is configured to receive, generate, and store specific segments of data associated with producing semantic normalized search results over legal content, markup display and automated contract review and commenting as described herein. In some embodiments, all or a portion of the database 112 can be integrated with the server computing device 106 or be located on a separate computing device or devices. For example, the database 112 can comprise one or more databases, such as MySQL™ available from Oracle Corp. of Redwood City, California.

Figure 2:
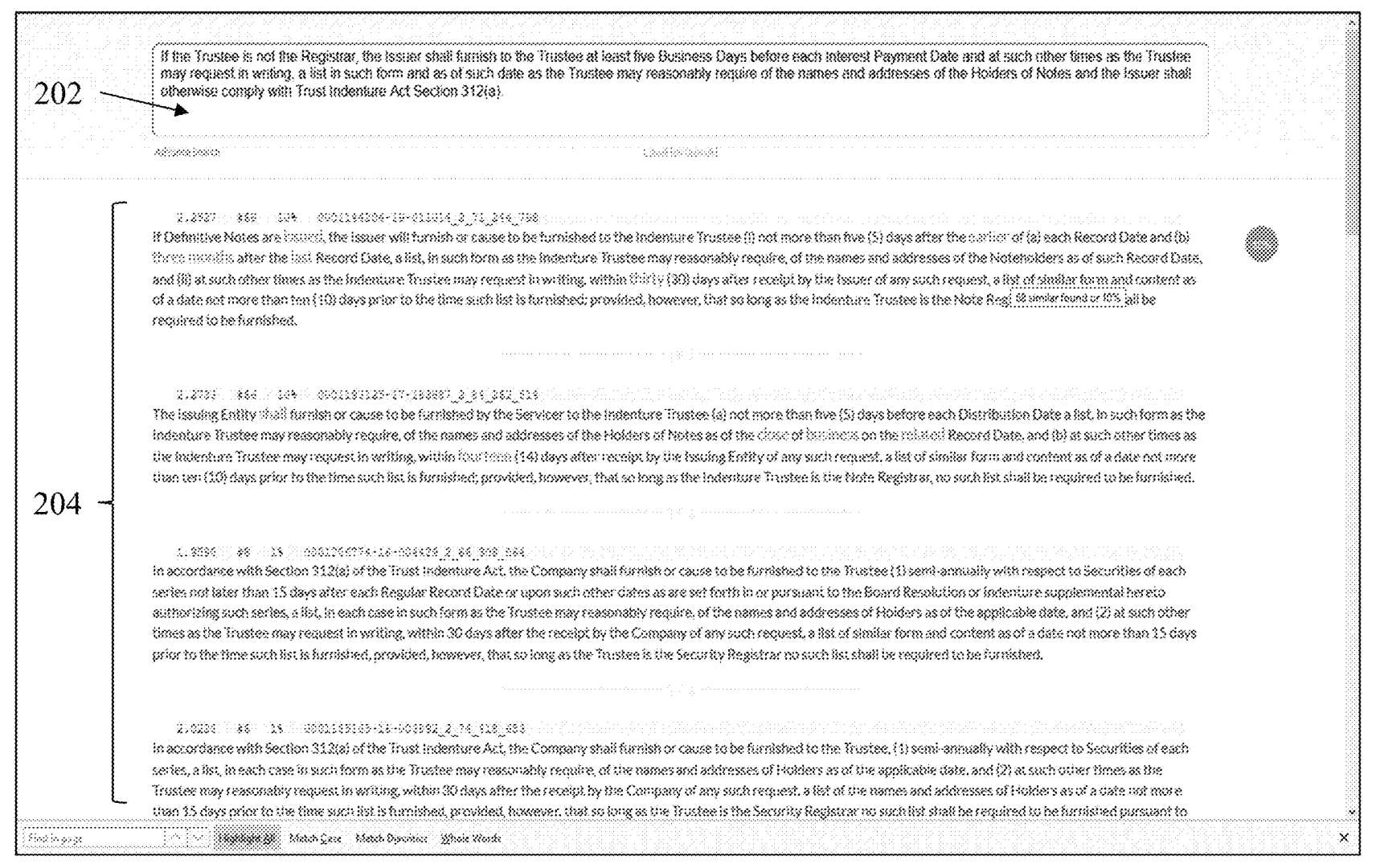

The following paragraphs describe exemplary functionality of the system 100 of FIG. 1. FIG. 2 is a diagram of an exemplary screenshot of a search user interface provided by UI module 107. For example, a user at client computing device 102 can perform a search by, e.g., pasting or typing in a sample clause to search box 202 and pressing Enter. In addition, in some embodiments a clause can be selected from a repository of previously determined or previously searched clauses in the database (e.g., made available by the UI module 107 via a drop-down box or other type of UI element).

In addition, from any search result (e.g., results 204), the user can click on a result and the system 100 allows the user to generate another search based on the text of that clicked-on text result. In addition, the search user interface can include an advanced search function which allows the user to limit a search using certain criteria, such as contract types, time period, contracting parties or different contract parts including: definitions, section headings, and exhibit names. Also, the search user interface can allow the user to enter various other search conditions that is typical of indexed text search databases.

When the server computing device 106 executes a search query based upon instructions received from the client computing device 102, the query can search an indexed database of unstructured text of previously ingested contracts (e.g., database 112). In some embodiments, before the results are displayed, the system 100 validates the results as being relevant to the clause text searched by using, e.g., open source similarity algorithms (such as the universal sentence encoder algorithm in the open source Tensorflow software) and/or indexing tools (such Apache Solr open source software). Indexing algorithms, such as Apache's Solr, order results by relevance scores and the system 100 can use such indexing algorithms as a filter based on score differentials. The universal sentence encoder scores similarity between two or more clauses on a score of 0 to 1. Scores above 0.8 generally indicate the clauses are the same, they may be worded differently but both are the same type of clause. For example, if a clause searched is a "Governing Law" clause and there are two results with scores of 0.9 and 0.4 to the clause searched, it is highly likely the 0.9 result is a Governing Law clause whereas the 0.4 result is likely not. This type of scoring technique is used by the system 100 to help ensure results 204 do not include results that are not of the same type of clause searched, and to ensure the entire result list 204 returned from the search execution are terms that are the same type as to the term searched.

Thereafter, the system 100 (e.g., search normalization module 108) can leverage common and proprietary natural language processing functions and algorithms to normalize the content of text search results. After the text is normalized, the distinct results are displayed as shown in FIG. 2.

As utilized herein, normalization is the process of homogenizing dissimilar text. Once homogenized, text that may have been dissimilar are considered equal. For example, the words "paper" and "papers" could be homogenized to "paper." Therefore, a search result that was distinct from another due to the difference in usage of the word "paper" is normalized and the results are treated as equal. The purpose of the normalization is to homogenize the content without changing the semantic content. The normalization causes the search results to be condensed because text search results after being normalized are no longer distinct from other results and therefore not displayed in the results (but they are retained as part of normalized group). The normalization process can also occur in part or in full prior to search in order to producer faster search results. By grouping semantically equal content, search results become less or non-redundant as to substantive value of the content and because they only show distinctly different substantive content give the user far readier access to the array of search results that are substantively different.

In some embodiments, the system 100 performs normalization using natural language processing (NLP) functions and algorithms—which are deployed to normalize the text search results, which puts the results into groups based on the equivalency of their content after normalization without changing the semantic content. The NLP algorithms used by the system 100 include publicly-available methodologies and certain innovative algorithms created specifically for use in the system 100. One example of an NLP function used by the system 100 is a word stemmer. For example, indemnification is reduced to "indemni" by the Lancaster stemmer, which is a common open source algorithm. By reducing the word to its stem "indemni," the word is normalized such that whether "indemnify," "indemnity" or "indemnification" is used in a provision, each word is stemmed to the same root. Any results containing variations of the word "indemnity" does not cause results to be treated dissimilar after normalization and as a result, these results can be grouped should that have been the only distinguishing difference in a clause.

The system 100 can also use other NLP tools (as more fully listed below), such as the removal of common stop words (words like "the" or "of"). Removal of stop words ensures that a stop word does not cause redundant results not to be grouped. In some embodiments, the system 100 deploys a library of NLP functions to normalize text results into equalized semantic groups notwithstanding differences in word use, semantic structure or other differences in text that have no bearing on the substantive meaning. These normalization functions remove redundancy and produces the array semantic variations of clause search results.

To produce results normalized by semantic content, the search normalization module 108 can perform one or more functions as detailed below to normalize text. Which functions to use can be user selected or pre-determined by the administrator. Each of the functions when deployed intend to result in a text result likely becoming identical to other normalized text results that utilized the same functions or that are otherwise already in existence:

1. Punctuation. The system 100 utilizes regex expression patterns to ignore all punctuation.
2. Other than Numbers and Letters. The system 100 utilizes regex expression patterns to ignore everything other than numbers and letters for purposes of normalization.
3. Numbers. The system 100 utilizes regex expression patterns to ignore all numbers for purposes of normalization.
4. Tense. The system 100 treats as equal for purposes of normalization past, present and future tense. For example: paid is treated equal to pay or "will" is treated as equal to "shall" or "shall have".
5. Defined Terms. The system 100 uses a proprietary methodology to ignore defined terms for purposes of normalization. Defined terms are a library of definitions developed by lawyers for and specific to a contract. For example, a typical defined term in a contract is: "'Business Day' shall mean any day other than a day banks are authorized by law or regulation to be closed." These defined terms create unwarranted differences because defined terms names are up to the drafter and as a result can vary randomly across contracts while still meaning the same thing. For example, although Business Day is one of the most common definition in contracts, the term "'Legal Holiday' means a day that banks are authorized to be closed". A legal provision might refer to "other than a Business Day" or "that is a Legal Holiday". Both are semantically equivalent but absent normalization are treated differently in search results. Without algorithms to normalize such defined terms, otherwise semantically identical text would be treated as distinct—thereby creating redundant results. By removing defined terms the text can be normalized.
6. Stop Words. The system 100 ignores all common stop words for purposes of normalization. Lists of stop words are generally available and used in colloquial writings as opposed to technical writing, and lists of such stop words are publicly available (e.g., at xpo6.com/list-of-english-stop-words/. Examples of stop words are: "of", "the", "at" etc.
7. Legal Stop Words. The system 100 ignores all legal stop words (based on a library designed specifically for the system 100) for purposes of normalization.
8. Synonyms. The system 100 treats as equal synonyms for purposes of normalization. For example: "answerable" is treated as not being different from "responsible."
9. Legal Synonyms. The system 100 treats as equal for purposes of normalization all legal usage words or phrases that are synonyms. For example: "Note" and "Security". The system 100 leverages a proprietary database of legal usage synonyms and synonym phrases to perform the normalization process described herein.
10. Phrase Synonyms. The system 100 treats as equal for purposes of normalization all phrase synonyms (two or more words that are synonymous with other phrases). For example: "act or omission" and "action taken or failed to take" are phrases that are synonymous and are normalized. The system 100 deploys a series of semantic analysis algorithms to determine phrases within sentences that are semantically equivalent. For example, the sentence "(1) The agent shall not be liable for any acts or omissions that are not negligent" and "(2) The agent shall not be liable for any act taken or suffered to be taken that are not negligent" are the same semantically at the sentence or clause level—the word phrases causes these sentences to be treated as different even after using normalization functions described herein. But the phrases "acts or omissions" or "act taken or suffered to be taken" are semantically equivalent. The system 100 uses what is commonly referred to as n-grams to break each of the sentences into all possible subcomponent parts starting with non-normalized or normalized text and measures their similarity to each other. From these comparisons, similarity phrases are determined based on each score of the comparison utilizing open source similarity algorithms. If the confidence levels scores are high, the results are automatically normalized or presented to the user to affirm if the scores are not high enough. For example, using an n-gram factor of seven would result in the phrases "act taken or suffered to be taken" to be determined to be semantically equivalent to "acts or omissions" and automatically normalized. The n-gramming can occur by taking words one through seven of sentence (1) (e.g., a first n-gram) and comparing it against words one through seven of sentence (2) (a second n-gram), then the system 100 can do the same for words two through seven of sentence (1) against words one through seven of sentence (2) until all words are exhausted in sentence (1). Then, the same occurs with words two through seven of sentence (1) to words one through seven of sentence (2), and so on, until all the n-grams are exhausted in sentence (1) because the system 100 has reached the end of the sentence (1). This would occur at word 16 to word 22 because word 22 is the last word in sentence (1) of n-gram 7 and therefore a new loop occurs. At the next loop, the only change is to start at word two of sentence (2) and sentence (1) starts again in the same manner previously noted. The system 100 deploys multiple n-gram factors for each sentence, generally each n-gram factor less than the max n-gram factor. In this case the n-gram factors deployed would be n-grams (1)-(7). After all n-grams are deployed the highest similarity scores are taken to determine which phrases are similar and should be normalized. Other factors are also utilized to determine equivalency such as number of stop words and stems. In addition, synonym phrases are retained in a library whether obtained in the manner noted above or by visual inspection.

11. Lemma. The system 100 treats as equal for purposes of normalization word lemmas. The system can utilize certain publicly available algorithms (such as the Natural Language Toolkit (NLTK) available from www.nltk.org) to reduce a word to its base word (known as lemming). For example: the lemma of "indemnifies" and "indemnifying" is "indemnify". Both words would therefore be treated equal for purposes of normalization.

12. Stemming. The system 100 treats as equal for purposes of normalization word stems. The invention uses widely available algorithms such as the Porter or Lancaster stemmers to stem a word to its root. For example, the stem of "indemnity" or "indemnify" is "indemn". Both words would therefore be treated equal for purposes of normalization.

13. Consecutive Duplicates. The system 100 can ignore all but the first instance of consecutively identical words (or the normalized version of that text such as their stem or base or synonym) for purpose of normalization.

14. Duplicates. The system 100 removes duplicate words. For example: "Subject to receipt of an Officer's Certificate in compliance with Section 9.01 hereof the Trustee shall act in accordance therewith provided such Officer's Certificate is received at the Corporate Trust Office of the Trustee." becomes "Subject to receipt of an Officer's Certificate in compliance with Section 9.01 hereof the Trustee shall act accordance therewith provided such is received at Corporate Trust Office."

15. Alphabetical Order. The system 100 alphabetically orders words for purpose of normalization. For example: "Subject to receipt of an Officer's Certificate" becomes "an Certificate of Officer's receipt Subject to" The system 100 can also normalize text by restructuring text as follows:

16. Lists to Sentences. Legal contracts are typically drafted using "list-sentences" where a lead-in clause is followed by a series of clauses wherein each is independently read in conjunction with the lead-in clause. The system 100 restructures the list-sentences by conjoining the lead-in to each clause in the list and treating each as an independent sentence. By restructuring the list of sentences into separate independent sentences, the list is thus normalized to instances in other contracts or otherwise to sentences drafted in a natural sentence format. Absent such normalization, each clause in the list would be severed from the lead-in clause—thereby causing incomplete context and would also create an inability to normalize with other contracts that utilize a natural sentence structure.

17. Parent-Child Sentences. Legal contracts are typically drafted using "parent-child sentences" wherein a paragraph contains a series of sub-numbered clauses. Each clause relates to its parent numbered clause. Each parent can have one or more child clauses (and each child can have one or more grandchild clauses and so on). Each child clause independently relates to the parent clause. The system 100 restructures the parent-child-sentences by conjoining each parent to each child and treating each parent-child as an independent sentence. The same process happens if a child has a grandchild wherein each parent child sentence is replicated to the extent there is two or more grandchildren, each such replication having the same parent and child but a distinct grandchild, the number of replications for each parent child is dependent on the number grandchildren. Because text can be drafted in either parent-child-sentence format or as individual sentences, restructuring parent-child-sentence into individual sentences normalizes the text. Absent such normalization, each but the first parent-child sentence would have text that is separated from the parent clause that gives meaning to the child clause—thereby causing incomplete context and would also create an inability to normalize with other contracts that utilized a natural sentence structure.

18. Algorithmic Assisted Normalization. The system 100 uses an algorithm to find those words or phrases across the returned normalized results that, if ignored for purposes of determining which results are different in their normalized text, would result in the greatest number of results being normalized. After the algorithm is run, the search results are reproduced with the new normalized groups. The words or phrases used to further normalize the results are recorded to allow for the search to be rerun or a new one with the normalization criteria available to be applied.

19. Packing Results. In some embodiments, a user can select two or more search results to normalize. The system 100 can thereafter treat each such and their underlying group of results as identical for purposes of normalization. The differences in the results deployed to normalize them are recorded to allow for the search to be re-run or a new one with the normalization criteria available to be applied. The user can continue this process across the full set of results by continuing to select two or more results to normalize. The system 100 also retains the word differences that were ignored for normalization and determines their semantic equivalency and if high enough will retain them for more widespread syntactical use.

20. Unpacking Results. In some embodiments, a user can denormalize (unpack) a search result. The system 100 can reduce normalization of search results by removing one of more normalized functions and show each of the resulting normalized groups within that result or it can show all the unique original umodified text results that make up the unpacked normalized group search result. The user can continue unpack results by removing a normalized function. Based on the unpacked normalized functions that remain the search can be rerun using such remaining normalized functions.

21. Word or Phrase Selection. The system 100 allows the user to highlight any phrase or word or series of phrases and words as words or phrases to normalize.

22. Legal Bearing or User Defined Normalization. In some embodiments, a user can normalize results based on difference of legal bearing (or other criteria) it defines. In addition, normalization can be based solely on these criteria. If a group is different in all other ways, but meets the user defined normalization criteria they are normalized based on the criteria and grouped accordingly. For example, the three results are worded as follows: (1) "The agent shall not be liable for other than its gross negligence or willful misconduct", (2) "The agent shall not be liable for other than its negligence or willful misconduct" and (3) "The agent shall not be liable for other than its negligence or willful breach." These three results can be normalized based on a user defined criteria of whether they contain the terms: 1. "gross negligence," "recklessness," 2. "negligence," 3. "willful misconduct," "willful breach," "willful default" or 4. "bad faith" are present. Results (1) would be categorized as the group containing the two criteria "gross negligence" and "willful misconduct", results (2) would be categorized as the group containing the two criteria "negligence" and "willful misconduct", results (3) would be categorized as the group containing the two criteria "negligence" and "willful breach". Therefore, results 1 would be in its own group and results 2 and 3 normalized from a user-defined legal bearing standpoint would be in the same group because the key words or phrases ("willful misconduct" and "willful breach") each share the same user defined criteria and are therefore both are in the same user defined groups. The shared normalization criteria of result 2 and 3 are "willful misconduct" and "willful breach" which are normalized.

The search normalization module 107 of the system 100 normalizes the results based on the application of one, some or all of the above functions resulting in groups of normalized text with the same semantic content or same legal bearing as defined by the user or any such other user defined criteria. The application of additional functions above further normalizes the text. In addition, one, some or all the above functions are performed on the text prior to indexing wherein the search is performed against the normalized text. This results in faster searches because extraneous text if removed.

For searching, the system 100 utilizes a proprietary database (e.g., stored in database 112) of contracts built from the Securities and Exchange Commission's Electronic Data Gathering, Analysis, and Retrieval (EDGAR) repository. Using this database, the system 100 can reduce a search that produces 1,000 results after initial normalization by 80 to 95% by removing text results that are nearly identical or are in fact identical.

The removal of such identical results reduces the pool to sixty results of the original 1,000. Using the above-described NLP functions, further normalization generally causes the results to be reduced by a further 60% to 90% with all semantic context differences retained. In this example, the results are further reduced to a pool of twenty.

In addition, the system 100 can perform further normalization based on an algorithm that analyzes phrases and words across the results and recommends to the user the selection of those words and phrases that the system 100 believes are in their context semantically similar and likely equivalent. In addition, the system 100 can provide to the user for selection a list of words the algorithm has chosen based on likelihood of the words having no bearing on the meaning of the text. In each case, this results in further normalization of the text results. In this example, the results pool is reduced to five, while retaining the array of semantically substantive differences. The system 100 advantageously retains and maps all the underlying unmodified text to each semantic group.

Group Counts. Each normalized search result is a group and is indexed to the many original unmodified text results that it represents. Each original unmodified text result can be identical to other original unmodified text results and can be a subcomponent of the corresponding normalized group. There can also be many non-identical original unmodified text results that are part of one normalized group.

The number of instances of each of the original unmodified text results that are identical to each other are counted and their total count and all original unmodified text result contract unique identification IDs are indexed to the normalized group being displayed.

The modified results are also indexed to a count of all results that when modified equals the normalized text group. The count of identical unmodified text is ranked against all others within a normalized group. The total count of all unmodified text within a normalized group is ranked against all others normalized groups. These ranks and figures are made available to the user in the results that are displayed.

Figure 3:
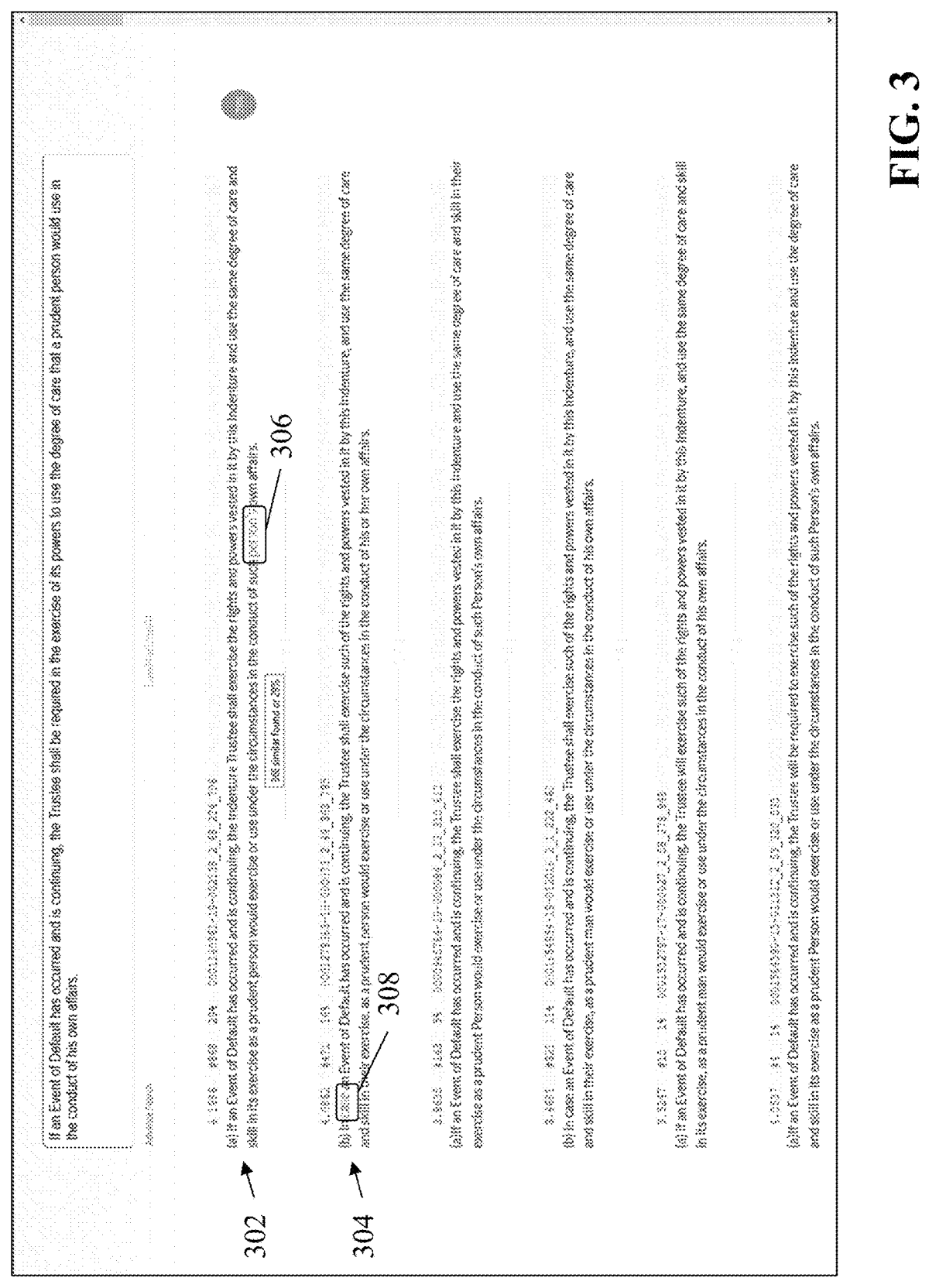

Semantic Words Highlighter. The system 100 (e.g., comparison module 110) deploys a semantic difference highlighter and markup tool across pairs of text search results that can generate visual representations (e.g., in conjunction with the UI module 107) of the various differences between the pairs of text for display to a user of client computing device 102. FIG. 3 is a diagram of a user interface screenshot of the system 100 showing the normalization of two groups of text by selecting them. In the example of FIG. 3, the user can select clauses (a) (ref. 302) and (b) (ref. 304) and normalize them. This results in the 29% of results in (a) combining with the 16% of results in (b). This is aided by the highlighting visual aide. The user can select a clause and have words present in one clause that are not in the other highlighted in that clause (in this case in light gray) and vice versa. In the example of FIG. 3, the first two clauses show that the word "person's" (ref. 306) is present in clause (a) but not in clause (b) and "case" (ref. 308) is present in clause (b) but not in (a). Whether or not each are present in the other is also based on its semantic context—i.e., proximity to other words. If, for example, "person" were present in (b) but not in the same semantic context, the word "person" would still show as being in (a) but not in (b) because they do not share the same semantic context. The first highlighting in FIG. 3 shows just the normalized text that is different. The second highlighting (after clicking a second time) shows the semantic context by including the words in relation to the normalized text that is different—as shown in FIG. 4.

Figure 4:
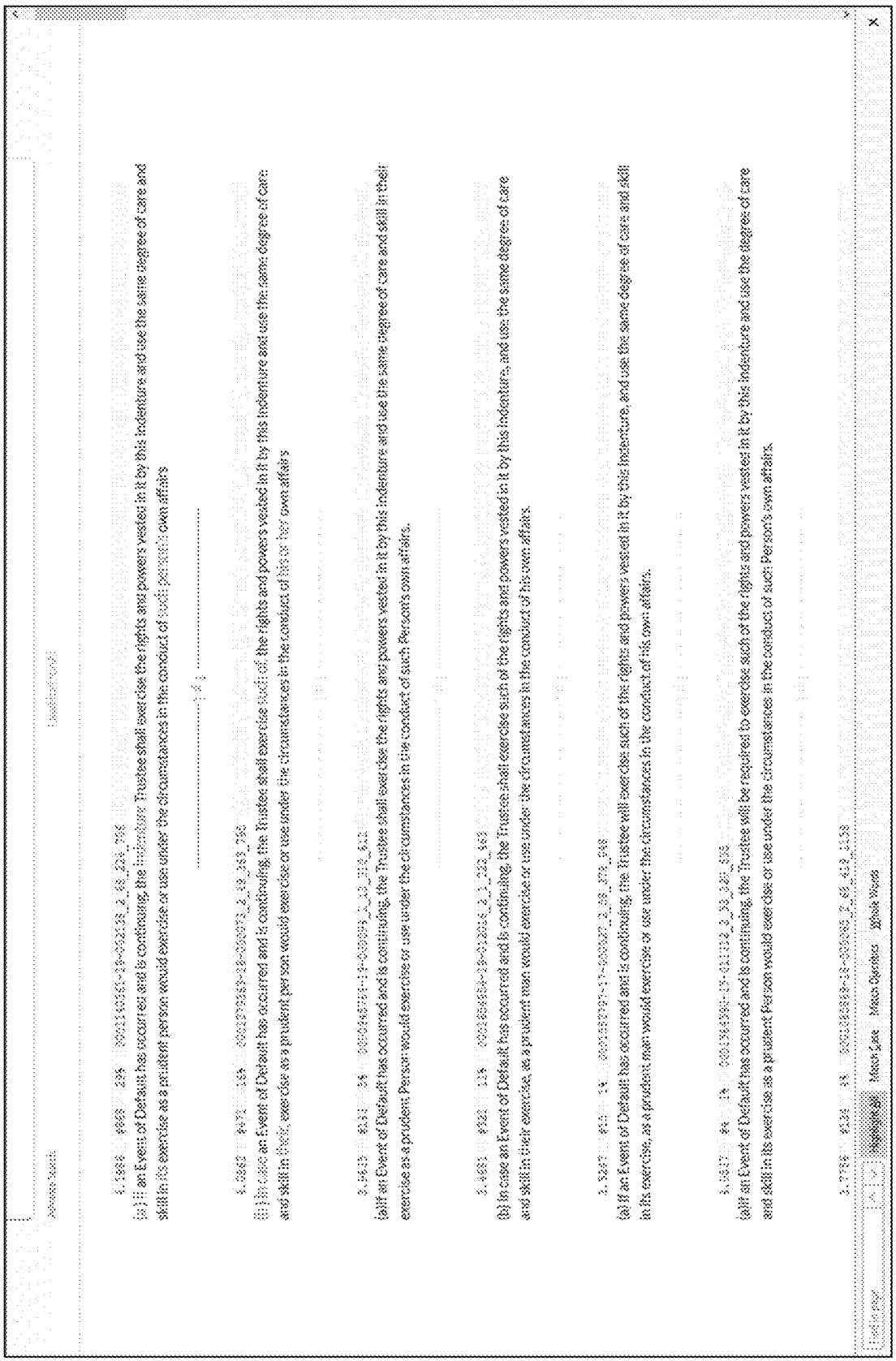
FIG. 4 is a diagram of a user interface screenshot generated by the system showing the semantic context by including the words in relation to the normalized text that are different, while also continuing to show words present in one but not the other.

FIG. 4 is a diagram of a user interface screenshot of the system 100 showing the semantic context by including the words in relation to the normalized text that are different, while also continuing to show words present in one but not the other. This supports a user in validating context and that the differences are of meaning or not. And, if they are not, they can instruct the invention to normalize the two results. The intention is to color the normalized text different within the overall contextual highlighting, such that "person's" in (a) would be green or some other color and "case" in (b) as well. The highlighter when fully functional would not highlight "(a)" or "(b)", "Indenture", "their", "such of". In addition, the colored "If", "In case", "person's" and "his or her" each would have a darker hue to distinguish them from text that has no bearing such as the word "such" preceding "person's". The "such" would continue to be highlighted but a less dark color or some other technique to emphasize the distinction between the two.

In some embodiments, the highlighter identifies the semantic differences between two examples of text. After identifying such instances, the highlighter shows those semantic inclusions in text number one that are not in text number two. Such changes (inclusions) are only reflected in text one. Simultaneously therewith, the highlighter shows semantic inclusions in text two that are not in text one. Such changes are only reflected in text two. This results in highlighted changes to the exclusion of non-consequential changes of the differences between the two results. This technique focuses the attention on semantic differences by only showing such changes and includes in each result only those changes that are unique to it and not the other. When these are displayed, the reader is able to quickly discern semantic differences without the obfuscation caused when all redline changes are highlighted and deletions shown.

Figure 5:
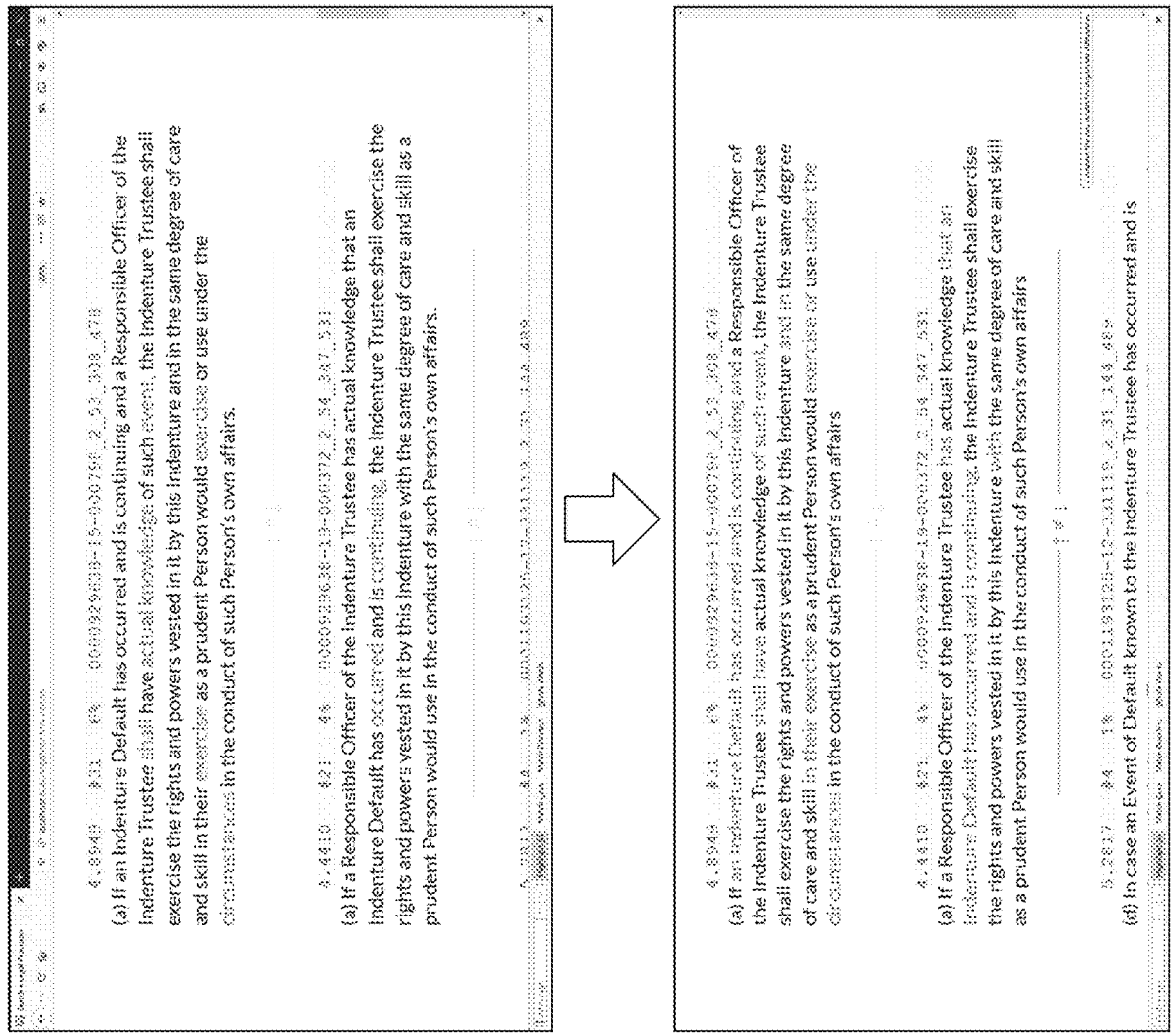
FIG. 5 is a diagram of a user interface screenshot generated by the system that shows the non-normalized text differences that encompasses the normalized text differences together with the normalized text differences.

Semantic Word Highlighter with Relevant Context. The comparison module 110 can deploy a second highlighter that performs the same function as the first highlighter described above, but also displays non-normalized text differences that provide the semantic context to the normalized highlighted differences—as shown in FIG. 5, which is a diagram of a user interface screenshot that shows the non-normalized text differences.

Semantic Markup. As mentioned above, the system 100 comprises a full markup tool consistent with existing comparison tools, but further beneficially does not mark changes that are not substantive or are otherwise normalized equivalents and not in semantic context of the change, but rather marks those changes which are semantically different and otherwise necessary to conform the provision. Similar to the highlighter, this markup procedure focuses the attention on what needs to be done in order to conform the provision while not making redline changes where it does not involve a semantic difference based on the normalized text differences.

Figure 6:
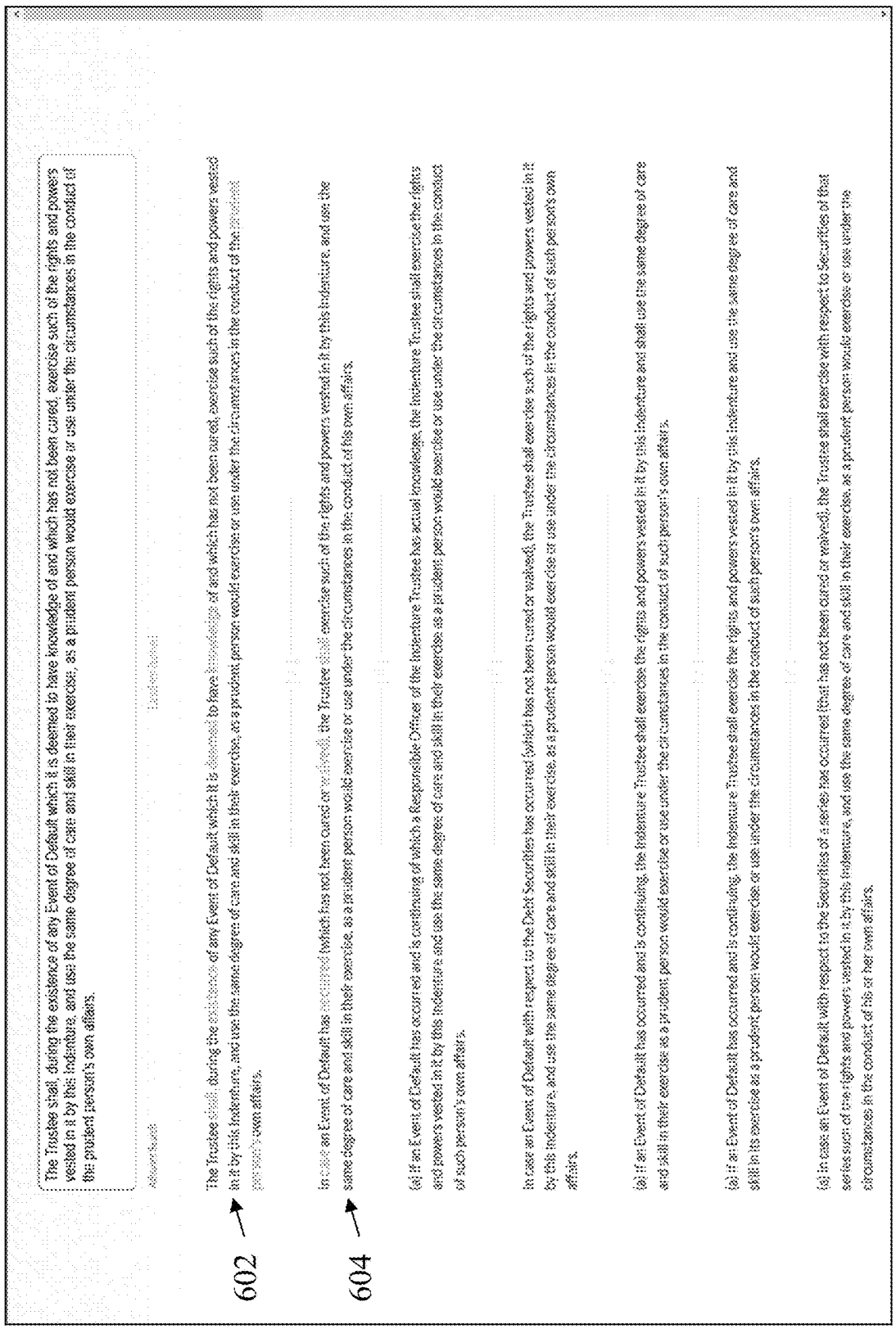
FIG. 6 is a diagram of a user interface screenshot generated by the system showing the normalized text of the two groups of text that are different by selecting them.

FIG. 6 is a diagram of a user interface screenshot showing the results of a compare of a sample clause. As shown in FIG. 6, the highlighter can perform a compare on the results of a sample clause that was searched. This displays in the first paragraph 602 the original text of the normalized words that are in the first highlighted paragraph that are not in the second, and in the second paragraph 604 the original text of the normalized words that are in the second paragraph that are not in the first. However, in each instance, an original text of the normalized words is still highlighted even if both results share the same word but such word is not in the same semantic context. See, for example, "prudent" (and "person's" a well)—which is highlighted in result one to designate it is not occurring in result two because that instance of prudent person is not in the same semantic context whereas the earlier instance of "prudent" (and "person" as well) in result one is in the same semantic context as result two so it is not highlighted.

Further, the system 100 can produce a comparison of substantive differences that provides a full grammatical and semantic redline. This redline can be contrasted withed markup that may be produced by existing markup tools (e.g., Microsoft® Word®), where the markup compares semantically equivalent text and results in a confusing and dense markup visualization.

Figure 7:
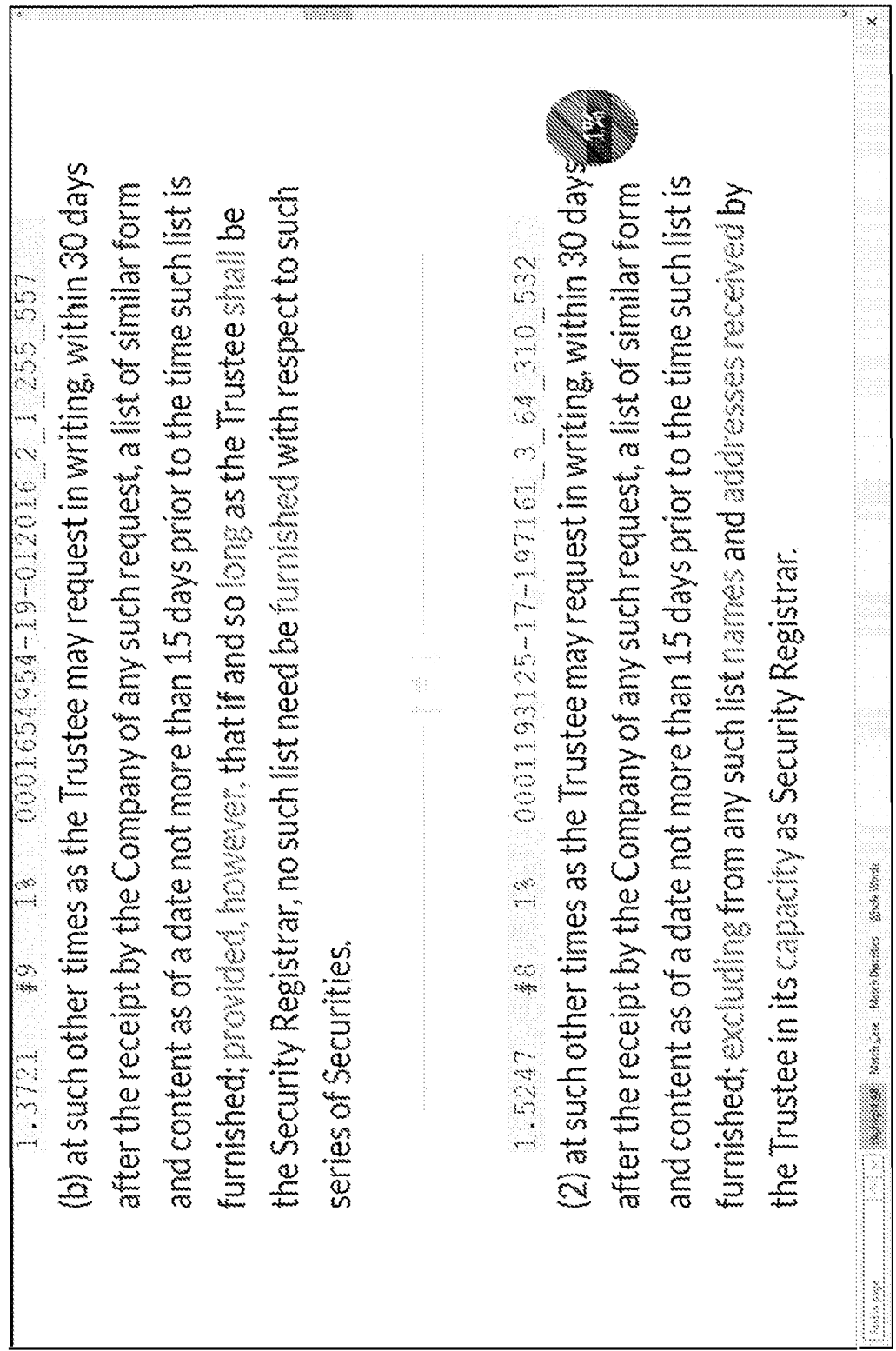
FIG. 7 is a diagram of a user interface screenshot generated by the system showing the highlighter of the present invention depicts just substantive differences where all text is normalized

An additional example of how the present system 100 can perform a compare on the results of a sample clause to show semantic differences is shown in FIG. 7—which is a user interface screenshot showing the highlighter of the present invention depicts just substantive differences where all text is normalized. In an additional example, the highlighter can show all differences in result one that are in result one and not in result two, while also showing all differences in result two that are not in result one, except for some or a subset of text normalized. In contrast, an existing markup tool would compare the two clauses to result in a less optimal markup.

It should be appreciated that the highlight and full markup display algorithms isolate the normalized text differences and the UI display gives them greater visibility through emphasis of the normalized text difference (i.e., semantic differences) to anchor the user of client computing device 102 as to the substance of why the provision is semantically different, as further context is highlighted surrounding the normalized differences. This continues to anchor the user as to the basis for the redline seeing quickly why that is and being able to quickly those other changes of non or lesser consequence but necessary to conform the sentence.

These displays create clarity and immediacy in isolating differences between results and more generally compared clauses. Advantageously, the user does not have to sift through the noise created by over-redlining (which is typically produced by traditional redlining tools) wherein all changes are reflected. The speed in which differences can be isolated by view among the provisions is increased because the "noise" created by redlining non-substantive differences is eliminated or reduced and by not including all changes of the two results in one provision. In addition, as mentioned previously, traditional markup tools do not focus on the provisions that have substantive import but rather every change. The number of changes that are not substantive often drown out those that are. Traditional markup tools used today combine these changes together with the changes represented in one comparison into one clause the amount of redline can be quite significant, nearly drowning out the ability to review those changes that are substantive.

This problem, when coupled with the need to review many different variations in drafting of clauses that are produced from a large array of search results, further compounds the ability to quickly assess how the provisions differ from a substantive standpoint. The highlighters and redliner of the present system 100 enable fast and efficient assessment to occur because the system 100 removes non-substantive differences from the text view and where conforming changes are highlighted or redlined, they are limited to the normalized differences and continue to anchor the reader to the semantic differences by visual aide that emphasizes them. And, by coupling normalized text reduces the variation of substance to review.

Commenter. The system 100 (e.g., comparison module 110) automates commenting of legal bearing to a contract based on user-defined normalization criteria. For example, the user can input their contract into the user interface (e.g., via copy/paste or uploading a document) and the system 100 takes a representative sample of the user-defined normalization criteria of legal bearing repository of variations of a clause and finds its corresponding clause that is the same type as the representative sample in the contract (using the same validation algorithms discussed in the search process as described above). This is performed for however many legal clause repositories have been built by the user. Each repository has many variations of a clause, which can number in the 1,000s (although it is not necessary). If there are ten clauses, for example, there can be ten repositories, and for each repository the process of validating a sample clause of the repository is found in the contract is performed. Thereafter, the system 100 provides the user with a selection of clauses redlined against the clause showing how in each instance that clause can be amended to conform to any of the user defined normalization groups of legal bearing for that repository. For example, a repository of clauses called "Standard of care" may in its most simplistic form have two normalization criteria, "negligence" or "gross negligence". As a result, a clause in the contract could be in either, all or none of them—thereby belonging to one of four groups.

Clause Repositories. The system 100 creates repositories of large number of variations of a legal term or clause for purposes of providing comments on an automated basis to contracts. A repository of clause variations can number in the multiple of thousands per legal provision when culled against a large database of contracts. These variations of a legal provision are derived through the same process as the search function described above, whether through the system's 100 standardized normalization functions or user-defined normalization criteria of legal bearing which is most applicable when providing automated comments or other user defined criteria. Each set of variations of a single clause is saved to a repository with all variations of that clause categorized by their normalized groups. The variations of clauses in the repository are each mapped to their normalized group. The variations clause repository is saved based on a user designated name, typically the name of the clause. These clause variations repositories form the basis by which comments are automated in the application to a user's contracts.

The Commenter. The legal provision or clause repositories serve as repositories by which comments will be automated to a user's contract that he or she is negotiating. The system 100 can take a contract that the user uploads into the user interface and perform a search against the contract in order to find the clauses to comment on in the contract. In order to find the clauses to comment on, the clauses that correspond to those in the repositories are searched. A representative sample clause from each repository of variations of that clause is used as the text search. That clause text is searched against the contract (together with any other conditions the user might other customarily require in an advanced search). After the search is returned against the contract to be analyzed, the same open source similarity and/or proprietary matching algorithms are used to validate the clause found in the contract is the same type as that in the repository.

Once the corresponding clause is found in the user's contract the system 100 automatically determines which normalization group of legal bearing the contract's clause is in. If for example the user created a repository of the legal provision "standard of care" and the user defined criteria were that of (1) "negligence", (2) "gross negligence", and (3) "willful misconduct," a provision that has "negligence" and "willful misconduct" would be in one group and that which has "gross negligence or "willful misconduct" would be in another user-defined normalized group.

Figure 8A:
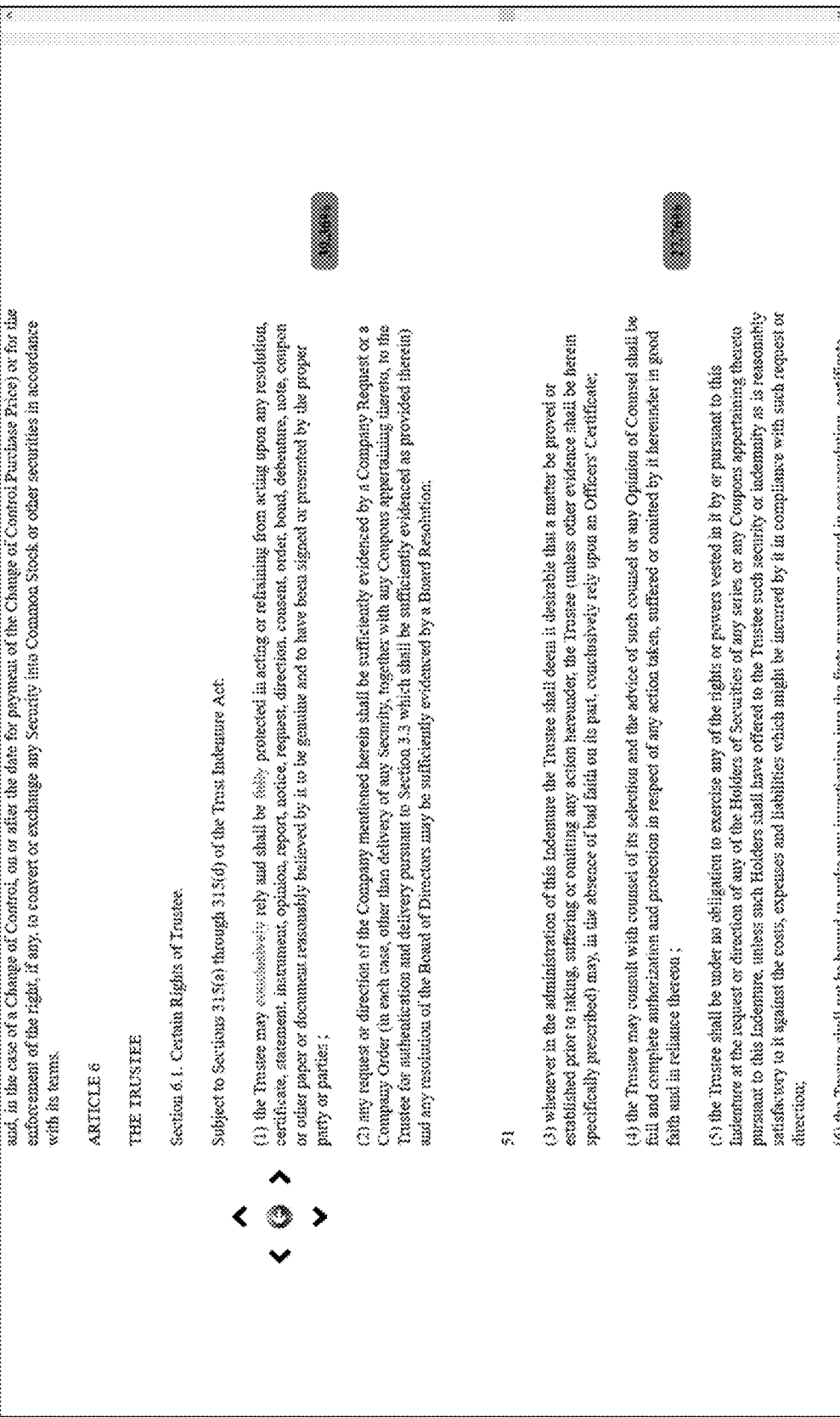
FIGS. 8A and 8B are diagrams of user interface screenshots generated by the system that present an analyzed contract and a sample of a portion of the contract section with the normalization, comment to the contract and markup techniques applied.
Figure 8B:
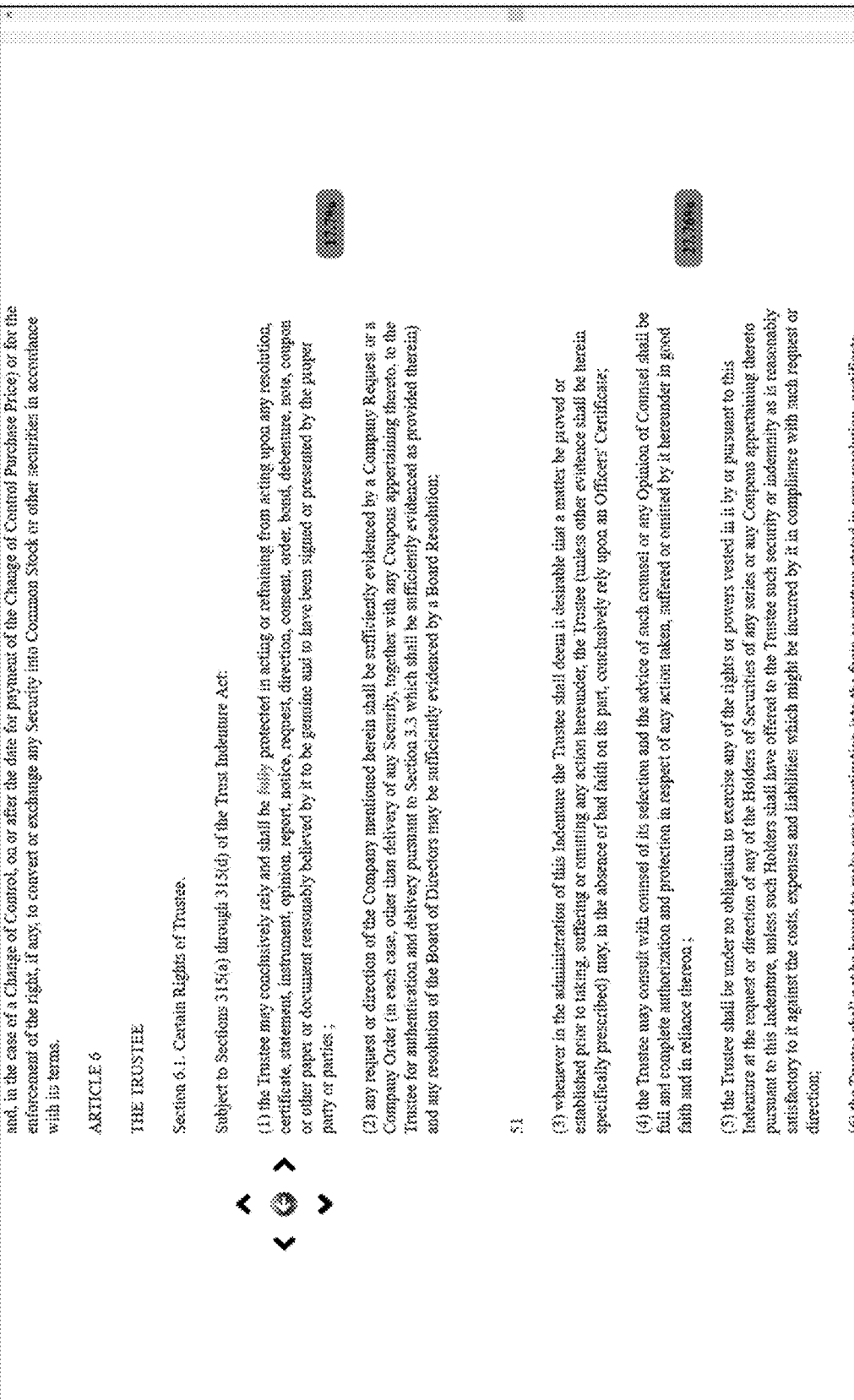

FIGS. 8A and 8B, and FIGS. 9A and 9B, are diagrams of user interface screenshots generated by the system 100 that present an analyzed contract and a sample of a portion of the contract section with the normalization and markup techniques applied. The system 100 analyzes the entire contract and applies comments to all the contract's clauses that correspond to those repositories. As shown in FIG. 8A, the automated comments made to Section 6.1(1) show the redline of the changes necessary to conform the original text of the client contract to that on the screen derived from the repository based on the user defined normalization criteria of legal bearing. In addition, the provision utilized from the repository of that legal provision's variations was chosen based on what provision which would cause the least amount of changes in order to conform such provision to the next (or within) normalized group in the manner displayed on the screen. Each normalized group within a repository of a provision's variations has multiple variations in drafting of text, sometimes more than a 1,000 or as few as a couple. The system 100 selects from these normalized groups those that, when applied to the contract's clause, conforms it to the group with as little change as possible, subject to other weighted algorithmic considerations. In addition, based on user defined normalization criteria of legal bearing this clause conforms with this user's normalization group when the automated comments (redline changes) are made and this normalized group is prevalent in contracts 39.36% of the time. In this case, the user defined normalization criteria of legal bearing included: "conclusively rely", "fully protected", "good faith" or "negligence" and "reasonable". In addition, the user edits the rendering in FIG. 8A wherein it can undo any of the automated comments (redlines) shown in FIG. 8A or add their own changes in redline format as well (deleting or inserting text). The user also has the ability to save the changes. Then, as shown in FIG. 8B, after scrolling to the next normalized group for Section 6.1(1) based on the user-defined normalization criteria of legal bearing, the system 100 shows that this group occurs 17.7% of the time after making the recommended changes in redline.

Similarly, as shown in FIG. 9A, Section 7.01(a) shows those changes necessary to conform to the normalized group that occurs 94.35% of the time for the clause "Prudent Person Standard of care." The system 100 normalizes "In case" with "If" because they are synonyms, "such of"

because they are stop words, and "Indenture," and "Indenture" because punctuation is the only difference.

And, as shown in FIG. 9B, Section 7.01(a) below shows those changes necessary to conform to the user's contract clause to the normalized group that occurs 2.42% of the time. One of the normalized criteria of legal bearing is "knowledge" of the Trustee—this is one example of an automated comment that could be made to the user's contract to conform to the normalized group whereby the Trustee must have known (or have had knowledge). The commenter was able to retrieve from the repository of variations of this clause that are within the normalized group that has this user defined criterial and introduce it to the screen in redline format with such selection from such normalized group being selected based on it resulting in the least amount of change while still conforming to the normalized group subject to other algorithmic considerations When the system 100 finds the corresponding provision of the user's contract, the system 100 determines which group the provision falls within and finds the closest match as to literal wording for the repository of variations of that clause, namely the match which produces the least amount of change for the user's provision to conform to that of the repository's based on the proprietary matching algorithms. Once the match is selected, the system 100 displays the match using the commenting/redline and highlighting modules described above. Because of the size or number of variations of a legal provision in these legal provision repositories, which can number in the multiple of thousands, in many cases the match may not show any variations. However, the match may be to a legal provision in the legal provision repository that may be written in a form that is unusual. Each legal provision in its repository has a count of how many times the text is written in its original format or in another normalized format. This allows the user to understand if their legal provision is written an unusual format if it matches or closely matches to that in legal provision's repository and such provision in the repository has a low count (i.e., infrequently used). The commenter uses the same group counting and text counting utilized in search while also deploying counts based on normalized functions that may be deployed. The user can scroll through variations of the clause within that normalization group to see how the clause is most often written and how that compares to the clause in the contract using the highlighting and markup tools described herein. Each time the user scrolls to another variation of the legal provision, the variation is displayed showing the redline changes necessary to conform the user's provision to the variation of the term in the normalized group. During this process, the system's 100 highlighter and markup tools are available which again streamline the changes to focus on those of semantic difference. This is important, because legal drafting often causes changes due to differences that are non-consequential that would otherwise cause significant blurring of the information to discern how in fact the clause in the contract may differ from the normative clauses in the library normalized groups. Generally speaking, only changes necessary in order to conform a provision to a more standard wording are the semantic differences and not those of the non-normalized content. The system 100 is able to distinguish between the user-defined criteria of legal bearing or of other type that do not relate to the specified normalization functions listed herein. As a result, the highlighting and markup tools are still deployed utilizing the functional normalization listed tools to display conforming changes within a user defined normalization group. And, when showing changes between the user-defined normalization group the clause falls within to that of another user defined normalization group the highlighter and mark up tools continue to emphasize the functional normalized differences between the contract clause being negotiated as well as an emphasis on the differences related to the user defined normalization criteria. More importantly, by ignoring non-semantic changes, the system 100 can create a larger repository of variations of a legal clause with greater homogeneity and applicability to a wider array of contracts. This significantly expands the span and breadth of contracts a repository of clauses can apply. If a user has defined their own criteria based on legal bearing, such changes can reflect how the current clause can be revised in order to conform to the other normalized group that has a different legal bearing. Using the example above, if the user has a legal provision normalized based on whether the standard of care is "negligence" or "gross negligence" and the clause found in the user's contract is "negligence," then the user can scroll through the variations of standard of care clauses drafting using a negligence standard and scroll through to the next normalized group where the criteria is "gross negligence" and see the changes that are necessary to be made in order to conform the user's clause to that normalized group and any variations in it.

As previously noted, the highlighting and markup tools are utilized to show the above-referenced changes. In addition, the markup tool can allow for additional modifications by the user to the extent additional changes are sought by the user. In addition, in some embodiments the system 100 can generate usage statistics, which are made available and displayed on the client computing device 102 to let the user know how often that particular normalized group is drafted into contracts. In addition, within each normalized group there are counts, as previously discussed, of how often text is written in the same structure as well as how often that normalized group is used and what ranking that normalized group has against all the other normalized groups, is it the most often used, etc. This informs both the algorithm and the user as to the best form of drafting by showing the user which text that is often used more frequently is it closest in matching two and in particular if the clause is drafted in a way that is highly unusual to recommend changes to make it more normative.

As can be appreciated, the methods and systems descried herein utilize proprietary algorithms to find clauses that are similar in a user's contract to that in the clause repositories that normalizes text without regard to the user's defined criteria, but through utilization of the standardized normalized functions listed above. This allows for application of user-defined normalized criteria of legal bearing (or otherwise) to have wider applicability. Contract terms can vary widely in drafting, which can make comparison nearly worthless when the changes are so significant it is not of value, because the differences cause one to review the entire clause. This in turn makes a large repository of clauses less valuable because it can be difficult for a user to quickly see how different normalized groups when applied to his clause impacts the drafting, given the value is in quickly seeing across a spectrum how drafting differs and to do so as discretely as possible (just show what needs to change). Absent a mechanism to greatly homogenize legal text, the applicability of a clause repository may be extremely limited (just that form contract).

But after normalization and through use of normalized highlighting and redlining—the applicability becomes global—any contract that has that clause is far more likely to be able to rely on the repository to have comments applied. This builds on itself because that is also a clause that can be grouped in the same clause repository. As a result, the system 100 makes it possible to provide comments across a wide array of contract types that contain wide arrays of drafting variations of a clause. As a result, clause repositories gathered from indentures are more likely usable for security agreements and loan agreements and so on.

Contract Analyzer. In addition to the above features, the system 100 allows an entire contract or subsection of a contract to be analyzed. For example, the system 100 takes the text that was pasted or uploaded into the search user interface (see FIG. 2) and breaks it into subcomponent parts, generally sentences, and performs searches of each sentence using the functions described previously to normalize the results and group them accordingly. The results of each search of each subcomponent of the contract are retained in libraries of the variations of that clause. The results presented to the user utilize the highlighting technique, both on a side-by-side basis. FIG. 10 is a diagram of a user interface screenshot that shows the side-by-side results in a tabular format. The results can also be presented wherein after the contract or section or paragraph of the contract is uploaded or pasted into the contract analyzer user interface the original rendering of the contract or section or paragraph uploaded is retained and maintained in the display when the contract analysis is finished and variations of each normalized group of each part of the contract, section or paragraph analyzed (typically sentences) is displayed using the same highlight and or redline techniques as described in the commenter that scrolls through each normalized group as exemplified in FIGS. 8A, 8B, 9A and 9B.

The search results of each clause searched are retained in as libraries of variations of that clause. Using algorithms to compare the searched text against the results, the system 100 enables a user to scroll through variations of the found clause as compared against the searched clause while displaying the highlighted differences and usage statistics. In some embodiments, the system 100 can use the same selection algorithms to find variations of a clause in the normalized search results that most closely pair with that of the searched text. The display of the results can have the full functionality as with a single sentence described herein, including side-by-side highlighting and markup tools, rank percentage usage, etc.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier Internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

The invention claimed is:

1. A method comprising:
executing a search query against a database containing multiple documents, wherein the search query includes an indication of a queried clause text;
retrieving search results including one or more documents that include multiple versions of the queried clause text;
performing one or more functions to generate normalized text for each document of the one or more documents, wherein the one or more functions includes converting one or more lists into sentences; and
wherein the normalized text is used to determine if the version of the clause text of the document is similar to a version of the clause text of another document;
grouping the search results into one or more groups including documents containing a respective version of the clause text that is similar to each other document in the respective groups; and
causing display of at least a portion of a particular version of the clause text relative to the queried clause text.

2. The method of claim 1, wherein the one or more functions includes removing one or more stop words in the version of the clause text.

3. The method of claim 1, wherein the one or more functions includes removing one or more defined terms.

4. The method of claim 1, wherein the one or more functions includes restructuring one or more parent-child sentences.

5. The method of claim 1, wherein the one or more functions includes using a regular expression to remove punctuation in the version of the clause text.

6. The method of claim 1, wherein the one or more functions includes using an algorithm to remove non-letter characters from the version of the clause text.

7. The method of claim 1, wherein the one or more functions includes removing one or more specific words or phrases from the version of the clause text.

8. The method of claim 1, wherein the one or more functions includes providing a substitute word or phrase for the version of the clause text.

9. The method of claim 1, wherein the one or more functions includes using a stemmer algorithm on the version of the clause text.

10. The method of claim 1, wherein the one or more functions includes removing duplicated terms from the version of the clause text.

11. The method of claim 1, wherein the one or more functions includes using an algorithm to determine one or more words or phrases that can be ignored or removed.

12. The method of claim 1, wherein a version of the clause text in a first document is determined to be similar to a version of the clause text in a second document if a generated score for the version of the clause text is above a threshold.

13. The method of claim 1, wherein the queried clause text is extracted from a portion of text in a document selected by a user.

14. The method of claim 1, wherein the queried clause text is a user-entered word or phrase.

15. The method of claim 1, wherein causing display of the at least a portion of the particular version of the clause text further includes:
causing display of a markup comparison of the queried clause text and the respective version of the clause text associated with the respective group of the groups of results.

16. A computer-readable storage medium storing instructions that, when executed by one or more processors, cause the one or more processors to perform a process, the process comprising:
executing a search query against multiple documents;

retrieving search results including documents with multiple versions of a queried clause text;

performing one or more functions to generate normalized text for each document of the one or more documents,
- wherein the one or more functions includes converting one or more lists into sentences or removing one or more defined terms; and
- wherein the normalized text is used to determine if the version of the clause text of the document is similar to a version of the clause text of a second document;

grouping the search results into one or more groups including documents containing a respective version of the clause text that is similar to each other document in the respective group; and causing display of at least a portion of a particular version of the clause text relative to the queried clause text.

17. The computer readable storage medium of claim 16, wherein a selected portion of text in a document includes the queried clause text.

18. The computer readable storage medium of claim 16, wherein the queried clause text is a user-entered word or phrase.

19. A computing system comprising:
one or more processors; and
a memory comprising instructions that, when executed by the one or more processors, cause the one or more processors to perform a process, the process comprising:

retrieve search results that satisfy a search query including a queried clause text, wherein the search results include documents from the multiple documents that include versions of the queried clause text;

performing one or more functions on the search results to obtain normalized search results,
- wherein the one or more functions includes converting one or more lists into sentences or removing one or more defined terms;

grouping the normalized search results into one or more groups of results, each respective group of results including documents containing a respective version of the clause text that is semantically equivalent to each other document in the respective group of results;

receiving an indication of a selection of a particular group from among the one or more groups of results,
- wherein the particular group is associated with a particular version of the queried clause text; and causing display of at least a portion of the particular version of the clause text relative to the queried clause text.

20. The method of claim 19, wherein the one or more functions further include removing words or phrases.

21. The method of claim 19, wherein the one or more functions further include restructuring sentences.

* * * * *